US012652741B2

(12) United States Patent
Lu et al.

(10) Patent No.: US 12,652,741 B2
(45) Date of Patent: Jun. 9, 2026

(54) LIGHTING DEVICE CONTROL SYSTEM HAVING FUNCTION DETECTING MECHANISM

(71) Applicant: Xiamen PVTECH Co., Ltd., Fujian (CN)

(72) Inventors: Fuxing Lu, Fujian (CN); Ronghui Wang, Fujian (CN); Zhirong Lin, Fujian (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 407 days.

(21) Appl. No.: 18/195,930

(22) Filed: May 10, 2023

(65) Prior Publication Data

US 2024/0244730 A1 Jul. 18, 2024

(30) Foreign Application Priority Data

Jan. 16, 2023 (CN) ......................... 202310075266.1

(51) Int. Cl.
*H05B 47/14* (2020.01)
*H05B 47/19* (2020.01)

(52) U.S. Cl.
CPC ............. *H05B 47/14* (2020.01); *H05B 47/19* (2020.01)

(58) Field of Classification Search
CPC ........ H05B 45/20; H05B 47/14; H05B 47/19; Y02B 20/40
See application file for complete search history.

(56) References Cited

U.S. PATENT DOCUMENTS

2008/0111491 A1* 5/2008 Spira .................... H05B 39/088 315/158
2012/0086335 A1* 4/2012 Nguyen ............... B60Q 11/002 315/77
2012/0169248 A1 7/2012 Tzeng
2014/0320031 A1* 10/2014 Wu ...................... H05B 45/397 315/193
2016/0192460 A1 6/2016 Dhingra
2020/0314975 A1* 10/2020 Pruett .................. H05B 39/041
2021/0003887 A1* 1/2021 Liu ...................... G09G 3/3406
(Continued)

FOREIGN PATENT DOCUMENTS

CN 207783207 U 8/2018

*Primary Examiner* — Raymond R Chai
(74) *Attorney, Agent, or Firm* — Bruce Stone LLP; Joseph A. Bruce

(57) ABSTRACT

A lighting device control system includes an active function detecting device and a control device. The active function detecting device is connected to an external power source and a lighting device, and includes an active detecting signal generating module and a function detecting module. The active detecting signal generating module transmits a dimming signal and a color temperature signal to the lighting device. The active detecting module detects the input current of the lighting device and the color temperature of the light emitted by the lighting device so as to generate a dimming function detecting result and a color temperature adjusting function detecting result. The control device generates a function analysis result according to the dimming function detecting result and the color temperature adjusting function detecting result, and display a control page corresponding to the function analysis result according to the function analysis result.

6 Claims, 7 Drawing Sheets

(56) References Cited

U.S. PATENT DOCUMENTS

| | | | | |
|---|---|---|---|---|
| 2021/0029788 | A1* | 1/2021 | Hu | H05B 45/10 |
| 2021/0352436 | A1* | 11/2021 | Roberts | H05B 47/1965 |
| 2022/0386435 | A1* | 12/2022 | Bessems | H05B 47/12 |
| 2025/0048524 | A1* | 2/2025 | Pessina | H05B 47/19 |

* cited by examiner

LIGHTING DEVICE CONTROL SYSTEM HAVING FUNCTION DETECTING MECHANISM

BACKGROUND OF THE INVENTION

1. Field of the Invention

The present invention relates to a lighting device control system, in particular to a lighting device control system having function detecting mechanism.

2. Description of the Prior Art

With the improvement of living standards, people's requirements for lighting devices are becoming higher. Various intelligent lighting devices with dimming function have been developed. Some currently available lighting devices merely support the on/off function, some support only the dimming and on/off functions, and some support the dimming, color temperature adjusting and on/off functions. However, a currently available lighting dimming controller does not provide a customized control page or interface, so the control page or interface of the dimming controller cannot fully correspond to the functions of each of the lighting devices. For example, if a dimming controller provides on/off interface, dimming interface and color temperature interface, but the lighting device only supports dimming and on/off functions. In this case, the color temperature interface of the dimming controller cannot properly function. Thus, the color temperature of the lighting device does not change when the user operates the color temperature interface. Therefore, the users may consider the lighting device or dimming controller malfunctions by mistake. As a result, these dimming controllers cannot be directly applied to these lighting devices, so the user needs to select different dimming controllers for different lighting devices, which is extremely inconvenient and cannot satisfy the actual requirements.

SUMMARY OF THE INVENTION

One embodiment of the present invention provides a lighting device control system having function detecting mechanism, which includes an active function detecting device and a control device. The active function detecting device is connected to an external power source and a lighting device, and includes an active detecting signal generating module and a function detecting module. The active detecting signal generating module transmits a dimming signal and a color temperature signal to the lighting device. The active detecting module detects the input current of the lighting device and the color temperature of the light emitted by the lighting device so as to generate a dimming function detecting result and a color temperature adjusting function detecting result. The control device generates a function analysis result according to the dimming function detecting result and the color temperature adjusting function detecting result, and display a control page corresponding to the function analysis result according to the function analysis result.

In one embodiment, the control device transmits a detecting instruction to the active detecting signal generating module to control the active detecting signal generating module to transmit the dimming signal and the color temperature adjusting signal to the lighting device.

In one embodiment, the function detecting module includes a current detector. The current detector generates a successful dimming function detecting signal when the current detector detects that the input current of the lighting device changes. The current detector generates a failed dimming function detecting signal when the current detector detects that the input current of the lighting device does not change.

In one embodiment, the function detecting module includes a color temperature detector. The color temperature detector generates a color temperature adjusting function detecting successful signal when the color temperature detector detects that the color temperature of the light emitted by the lighting device changes. The color temperature detector generates a color temperature adjusting function detecting failure signal when the color temperature detector detects that the color temperature of the light emitted by the lighting device does not change.

In one embodiment, the color temperature detector is a photoresistor sensor.

In one embodiment, the control page is a first control interface having a switch interface, a second control interface having the switch interface and a color temperature interface, a third control interface having the switch interface and a dimming interface or a fourth control interface having the switch interface, the color temperature interface and the dimming interface.

In one embodiment, the lighting device control system further includes a control interface selecting switch having a first gear corresponding to the first control interface, a second gear corresponding to the second control interface, a third gear corresponding to the third control interface and a fourth gear corresponding to the fourth control interface.

In one embodiment, the control interface selecting switch further includes a function detecting gear for controlling the active detecting signal generating module to transmit the dimming signal and the color temperature adjusting signal to the lighting device.

In one embodiment, the active function detecting device further includes a wireless communication chip for receiving the dimming function detecting result and the color temperature adjusting function detecting result in order to transmit the dimming function detecting result and the color temperature adjusting function detecting result to the control device.

In one embodiment, the wireless communication protocol is a WIFI™ communication protocol, a Bluetooth™ communication protocol or a ZigBee™ communication protocol.

The lighting device control system having function detecting mechanism in accordance with the embodiments of the present invention may have the following advantages:

(1) In one embodiment of the present invention, the lighting device control system includes an active function detecting device and a control device. The active function detecting device includes an active detecting signal generating module and a function detecting module. The active detecting signal generating module transmits a dimming signal and a color temperature adjusting signal to a lighting device. The function detecting module detects the input current of the lighting device and the color temperature of the light emitted by the lighting device so as to generate a dimming function detecting result and a color temperature adjusting function detecting result. The above active detecting mechanism makes the control device be able to generate a function analysis result according to the dimming function detecting result and the color temperature adjusting function detecting result. Then, the control device can display the control page corresponding to the function analysis result according to the function analysis result. In this way, the control page provided by the control device can be completely corresponding to the function of the lighting device in order to effectively avoid that the user considers that the lighting device malfunctions or the dimming controller malfunctions by mistake, which can improve user experience and meet actual requirements.

(2) In one embodiment of the present invention, the lighting device control system includes the active function detecting device and the control device. The active function detecting device includes the active detecting signal generating module and the function detecting module, which can provide the active detecting function. Therefore, the control function of the control page provided by the control device can be completely corresponding to the function of the lighting device. As a result, the lighting device control system can be applied to different lighting devices, which is more comprehensive in use.

(3) In one embodiment of the present invention, the active function detecting device of the lighting device control system has a function detecting gear, a first gear corresponding to a first control interface, a second gear corresponding to a second control interface, a third gear corresponding to a third control interface and a fourth gear corresponding to a fourth control interface. Accordingly, the user can operate the above gears in order to actively active the aforementioned active detecting mechanism or directly designate the control interfaces which the control page of the control device needs to provide. Therefore, the lighting device control system can be more flexible in use and can conform to actual requirements.

(4) In one embodiment of the present invention, the control device of the lighting device control system may be a smart phone, a smart watch, a tablet computer, a laptop computer, a personal computer or other similar devices. The control device can execute an application to generate the function analysis result according to the dimming function detecting result and the color temperature adjusting result so as to display the control page corresponding to the function analysis result. Thus, the user can execute the above function via any one of the mobile devices, which is more convenient in use. In this way, the popularity of the lighting device control system can be further increased.

(5) In one embodiment of the present invention, the control device of the lighting device control system can perform the application to execute more functions. Thus, the control device can execute various intelligent operations so as to increase the functionality of the lighting device. Accordingly, the lighting device control system can conform to the future development trend.

(6) In one embodiment of the present invention, the design of the lighting device control system is simple, so the lighting device control system can achieve the desired technical effects without significantly increasing the cost thereof. Therefore, the lighting device control system can have high commercial value.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
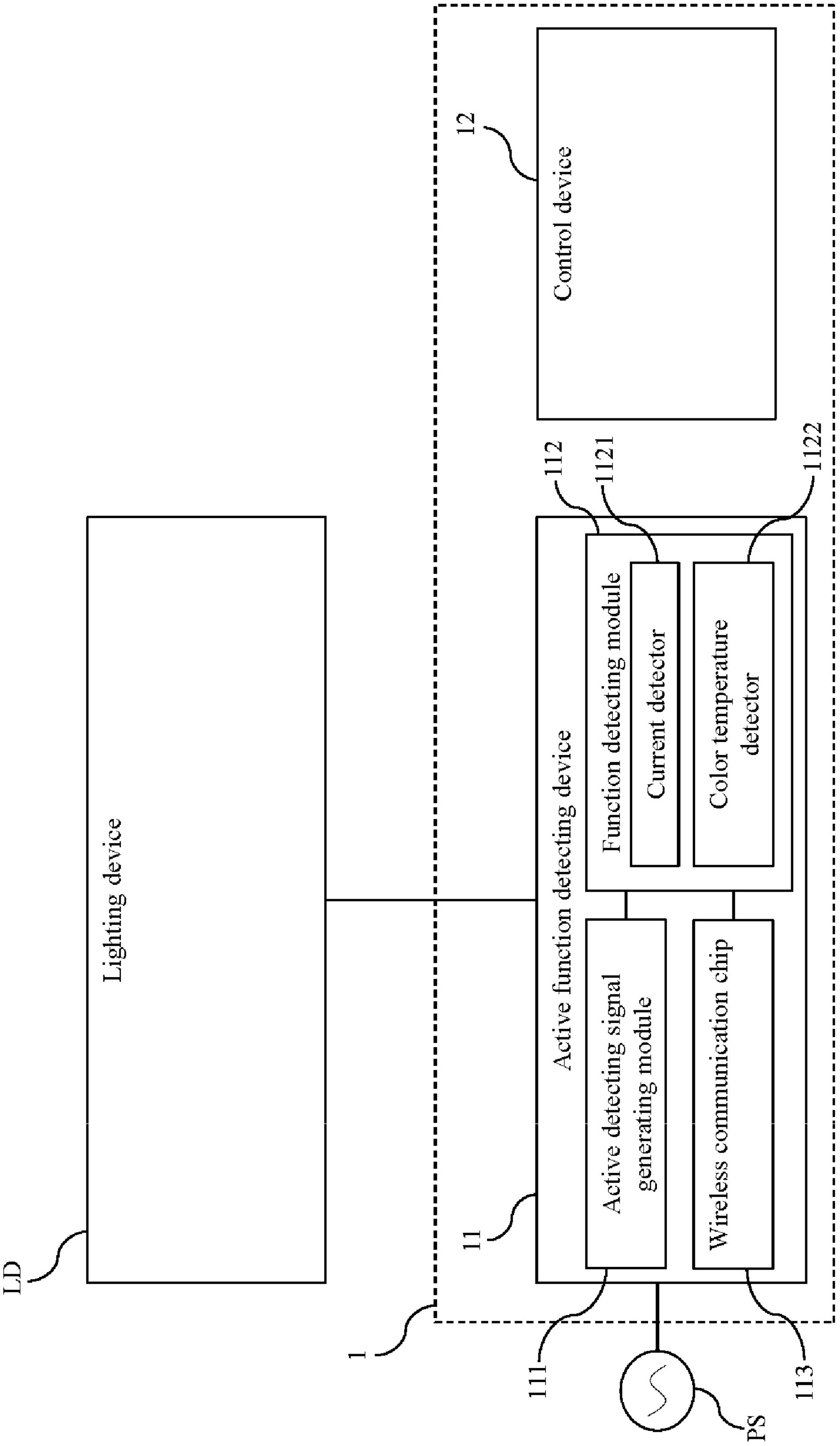
FIG. 1 is a block diagram of a lighting device control system having function detecting mechanism in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a block diagram of a lighting device control system having function detecting mechanism in accordance with one embodiment of the present invention. As shown in FIG. 1, the lighting device control system 1 includes an active function detecting device 11 and a control device 12. The active function detecting device 11 can communicate with the control device 12. In one embodiment, the control device 12 may be a smart phone, a smart watch, a tablet computer, a laptop computer, a personal computer or other currently available electronic devices.

The active function detecting device 11 is connected to an external power source PS and a lighting device LD. The active function detecting device 11 includes an active detecting signal generating module 111, a function detecting module 112 and a wireless communication chip 113. The function detecting module 112 is connected to the active detecting signal generating module 111 and the wireless communication chip 113. The function detecting module 112 includes a current detector 1121 and a color temperature detector 1122. In one embodiment, the current detector 1121 is a circuit having at least one resistor or other currently available circuits having current detecting function so as to provide the current detecting function. In one embodiment, the color temperature detector 1122 may be a photoresistor or other currently available components having color temperature detecting function.

The embodiment just exemplifies the present invention and is not intended to limit the scope of the present invention; any equivalent modification and variation according to the spirit of the present invention is to be also included within the scope of the following claims and their equivalents.

Figure 2:
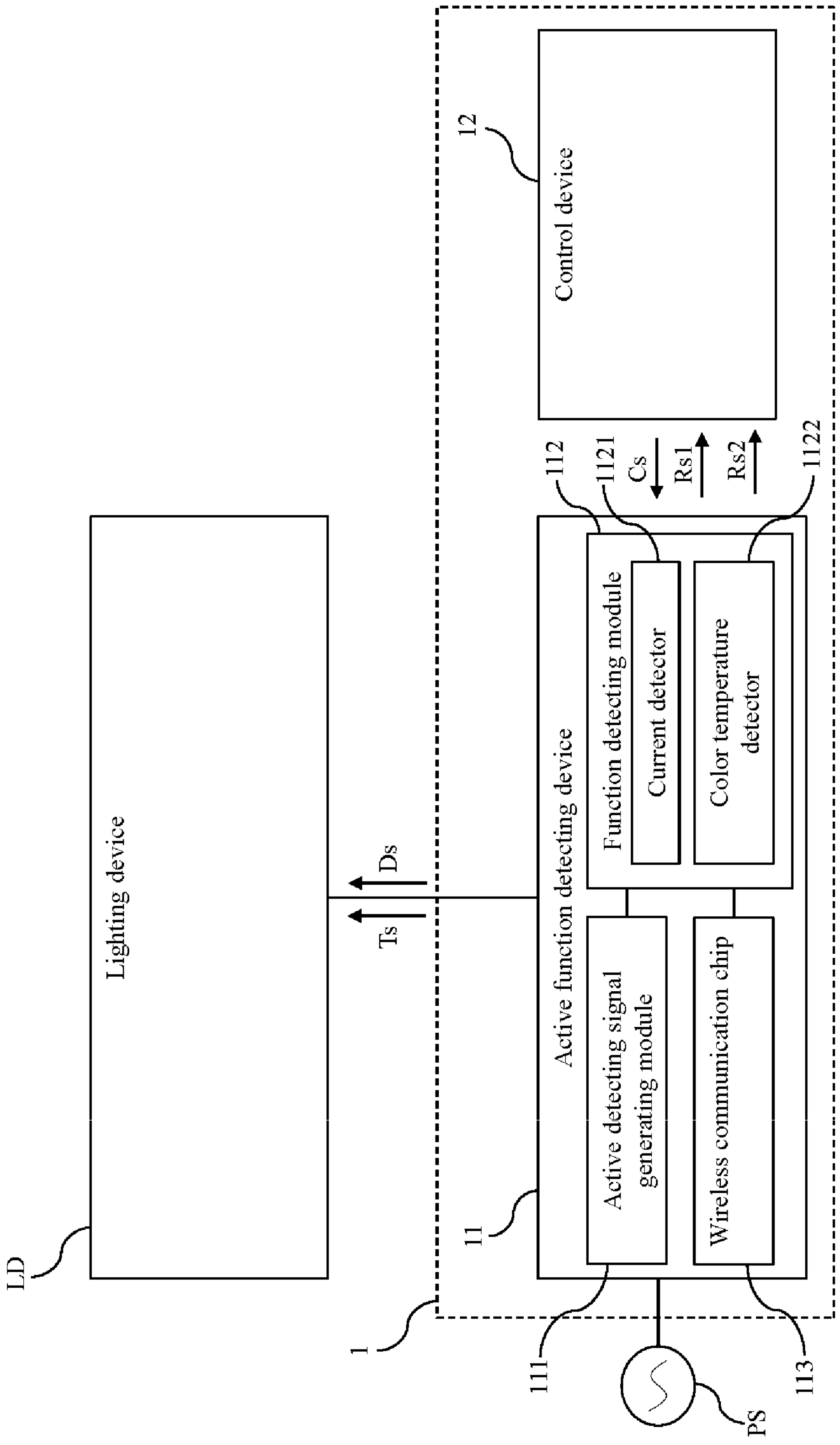
FIG. 2 is a first schematic view for illustrating an operating state of the lighting device control system having function detecting mechanism in accordance with one embodiment of the present invention.

Please refer to FIG. 2, which is a first schematic view for illustrating an operating state of the lighting device control system having function detecting mechanism in accordance with one embodiment of the present invention. As shown in FIG. 2, the control device 12 transmits a detecting instruction Cs to the active detecting signal generating module 11 so as to control the active detecting signal generating module 11 to transmit a dimming signal Ds and a color temperature adjusting signal Ts to the lighting device LD. After the lighting device 1 receives the dimming signal Ds, the function detecting module 112 detects whether the input current of the lighting device LD changes via the current detector 112. Then, the function detecting module 112 can generate a dimming function detecting result Rs1 and transmit the dimming function detecting result Rs1 to the control device 12 via the wireless communication chip 113. If the current detector 1121 detects that the input current of the lighting device LD changes, the current detector 1121 generates a successful dimming function detecting signal to serve as the dimming function detecting result Rs1. On the contrary, if the current detector 1121 detects that the input current of the lighting device LD does not change, the current detector 11212 generates a failed dimming function detecting signal to serve as the dimming function detecting result Rs1.

Similarly, after the lighting device LD receives the color temperature adjusting signal Ts, the function detecting module 112 detects the color temperature of the light emitted by the lighting device LD via the color temperature detector 1122 in order to generate a color temperature adjusting function detecting result Rs2. If the color temperature detector 1122 detects that the light emitted by the lighting device LD changes, the color temperature detector 1122 generates a color temperature adjusting function detecting successful signal to serve as the color temperature adjusting function detecting result Rs2. On the contrary, of the color temperature detector 1122 detects that the light emitted by the lighting device LD does not change, the color temperature detector 1122 generates a color temperature adjusting function detecting failure signal to serve as the color temperature adjusting function detecting result Rs2. In addition, the wireless communication chip 113 can receive the dimming function detecting result Rs1 and the color temperature adjusting function detecting result Rs2, and then transmit which to the control device 12 via a wireless communication protocol. In one embodiment, the wireless communication protocol may be WIFI™ communication protocol, Bluetooth™ communication protocol, ZigBee™ communication protocol or other currently available communication protocols.

Afterward, the control device 12 can generate a function analysis result according to the dimming function detecting result Rs1 and the color temperature adjusting function detecting result Rs2. Then, the control device 12 displays the control page corresponding to the function analysis result according to the function analysis result.

The embodiment just exemplifies the present invention and is not intended to limit the scope of the present invention; any equivalent modification and variation according to the spirit of the present invention is to be also included within the scope of the following claims and their equivalents.

Figure 3:
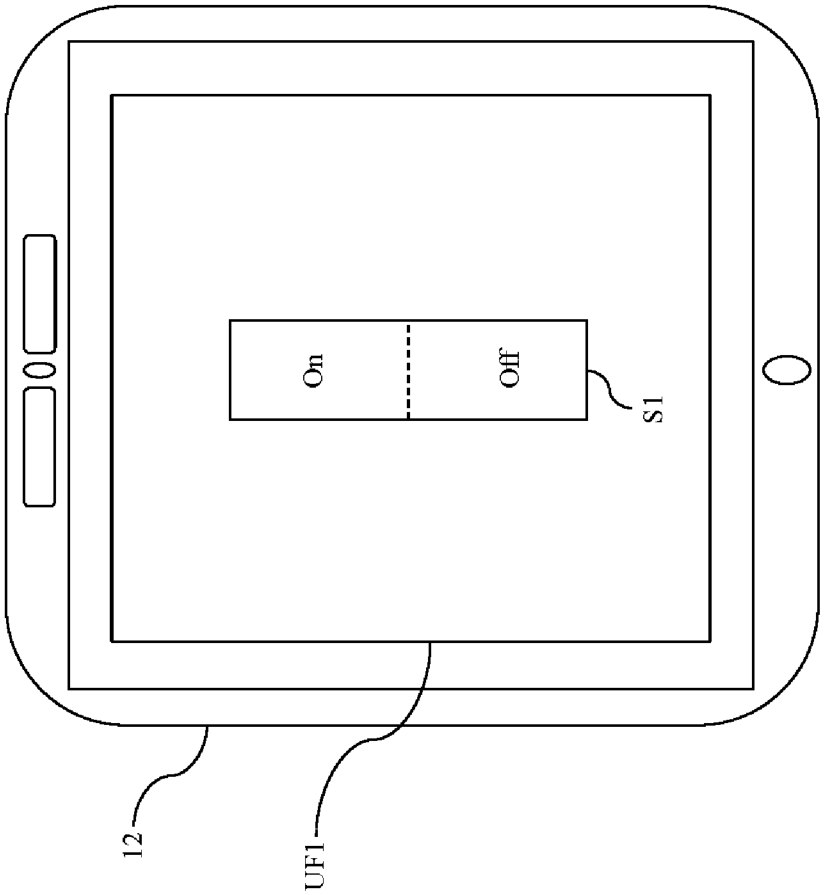
FIG. 3 is a first schematic view of a control device of the lighting device control system having function detecting mechanism in accordance with one embodiment of the present invention.

Please refer to FIG. 3, which is a first schematic view of a control device of the lighting device control system having function detecting mechanism in accordance with one embodiment of the present invention. As set forth above, the control device 12 can generate the function analysis result according to the dimming function detecting result Rs1 and the color temperature adjusting function detecting result Rs2. Then, the control device 12 can display the control page corresponding to the function analysis result according to the function analysis result. As shown in FIG. 3, if the dimming function detecting result Rs1 and the color temperature adjusting function detecting result Rs2 received by the control device 12 are the failed dimming function detecting signal and the color temperature adjusting function detecting failure signal respectively, the function analysis result displays that the lighting device LD does not have the dimming function and the color temperature adjusting function. In this case, the control page displayed by the control device 12 is a first control interface UF1, which only has a switch interface S1.

The embodiment just exemplifies the present invention and is not intended to limit the scope of the present invention; any equivalent modification and variation according to the spirit of the present invention is to be also included within the scope of the following claims and their equivalents.

Figure 4:
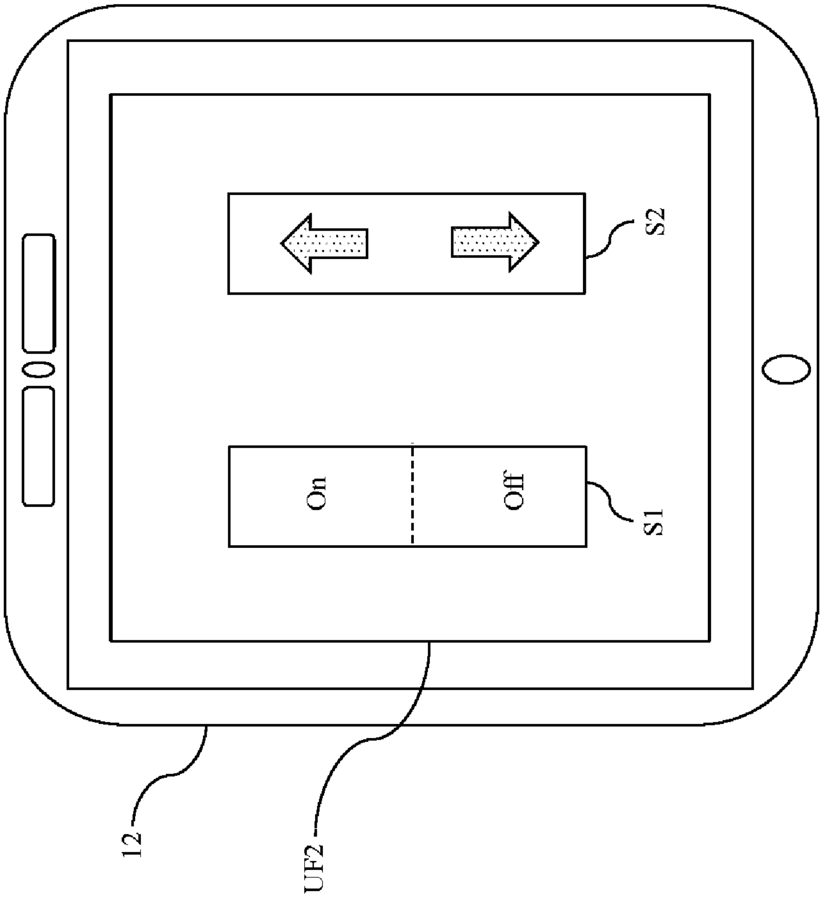
FIG. 4 is a second schematic view of a control device of the lighting device control system having function detecting mechanism in accordance with one embodiment of the present invention.

Please refer to FIG. 4, which is a second schematic view of a control device of the lighting device control system having function detecting mechanism in accordance with one embodiment of the present invention. As shown in FIG. 4, if the dimming function detecting result Rs1 and the color temperature adjusting function detecting result Rs2 received by the control device 12 are the failed dimming function detecting signal and the color temperature adjusting function detecting successful signal respectively, the function analysis result displays that the lighting device LD has no the dimming function, but has the color temperature adjusting function. In this case, the control page displayed by the control device 12 is a second control interface UF2, which has the switch interface S1 and a color temperature adjusting interface S2.

The embodiment just exemplifies the present invention and is not intended to limit the scope of the present invention; any equivalent modification and variation according to the spirit of the present invention is to be also included within the scope of the following claims and their equivalents.

Figure 5:
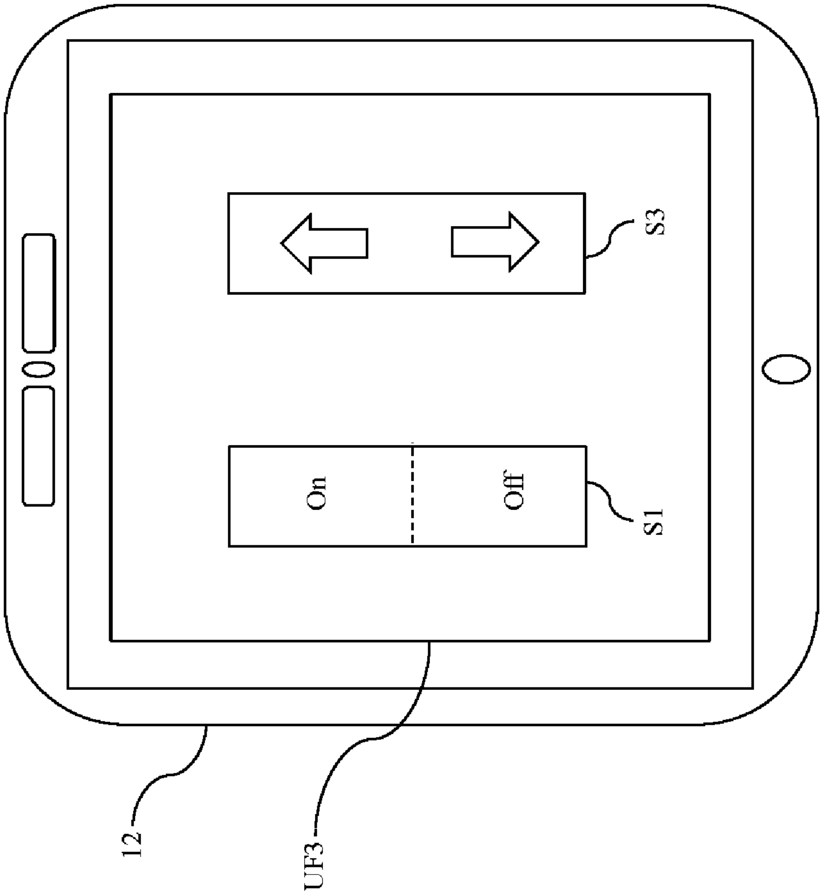
FIG. 5 is a third schematic view of the control device of the lighting device control system having function detecting mechanism in accordance with one embodiment of the present invention.

Please refer to FIG. 5, which is a third schematic view of the control device of the lighting device control system having function detecting mechanism in accordance with one embodiment of the present invention. As shown in FIG. 5, if the dimming function detecting result Rs1 and the color temperature adjusting function detecting result Rs2 received by the control device 12 are the successful dimming function detecting signal and the color temperature adjusting function detecting failure signal respectively, the function analysis result displays that the lighting device LD has the dimming function, but has no the color temperature adjusting function. In this case, the control page displayed by the control device 12 is a third control interface UF3, which has the switch interface S1 and a dimming interface S3.

The embodiment just exemplifies the present invention and is not intended to limit the scope of the present invention; any equivalent modification and variation according to the spirit of the present invention is to be also included within the scope of the following claims and their equivalents.

Figure 6:
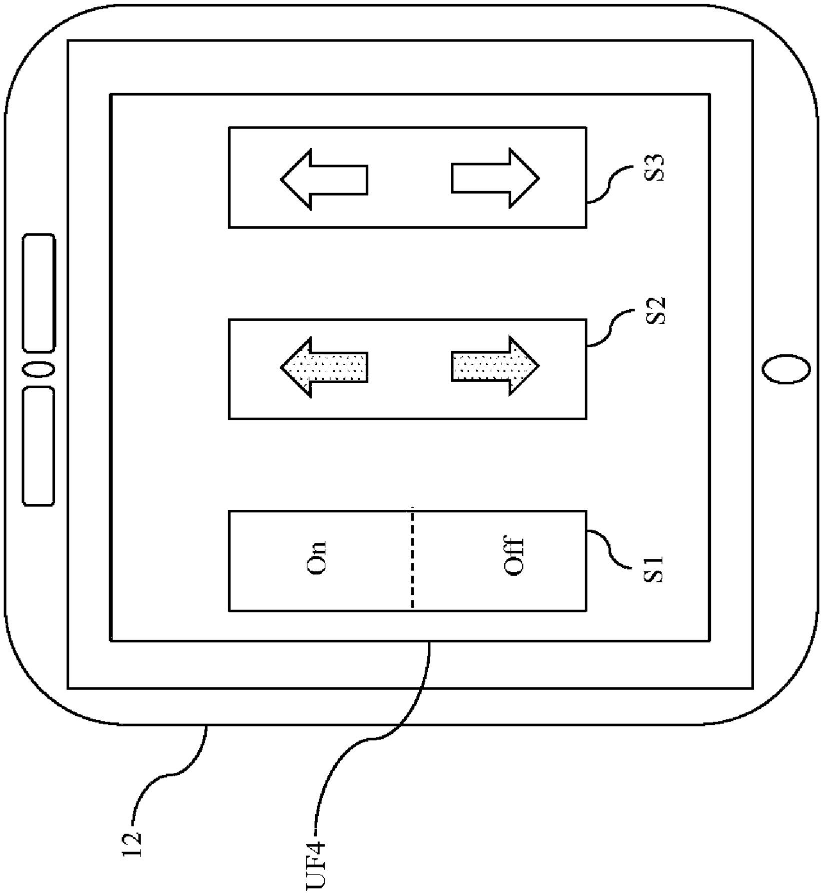
FIG. 6 is a fourth schematic view of the control device of the lighting device control system having function detecting mechanism in accordance with one embodiment of the present invention.

Please refer to FIG. 6, which is a fourth schematic view of the control device of the lighting device control system having function detecting mechanism in accordance with one embodiment of the present invention. As shown in FIG. 6, if the dimming function detecting result Rs1 and the color temperature adjusting function detecting result Rs2 received by the control device 12 are the successful dimming function detecting signal and the color temperature adjusting function detecting successful signal respectively, the function analysis result displays that the lighting device LD has the dimming function and the color temperature adjusting function. In this case, the control page displayed by the control device 12 is a fourth control interface UF4, which has the switch interface S1, the color temperature adjusting interface S2 and the dimming interface S3.

As previously stated, the above active detecting mechanism makes the control device 12 be able to generate the function analysis result according to the dimming function detecting result Rs1 and the color temperature adjusting function detecting result Rs2. Then, the control device 12 can display the control page corresponding to the function analysis result according to the function analysis result. In this way, the control page provided by the control device 12 can be completely corresponding to the function of the lighting device LD in order to effectively avoid that the user considers that the lighting device LD malfunctions or the dimming controller malfunctions by mistake, which can improve user experience and meet actual requirements.

In addition, since the control function of the control page provided by the control device 12 can be completely corresponding to the function of the lighting device LD. As a result, the lighting device control system 1 can be applied to different lighting devices LD, which is more comprehensive in application and more flexible in use.

The embodiment just exemplifies the present invention and is not intended to limit the scope of the present invention; any equivalent modification and variation according to the spirit of the present invention is to be also included within the scope of the following claims and their equivalents.

It is worthy to point out that currently available lighting dimming controllers do not provide customized control pages or interfaces, so the control pages or interfaces of the dimming controllers cannot fully correspond to the functions of each of the lighting devices. Therefore, the users may consider the lighting device or dimming controllers malfunction by mistake. Thus, the currently available dimming controllers cannot satisfy the actual requirements. On the contrary, according to one embodiment of the present invention, the lighting device control system includes an active function detecting device and a control device. The active function detecting device includes an active detecting signal generating module and a function detecting module. The active detecting signal generating module transmits a dimming signal and a color temperature adjusting signal to a lighting device. The function detecting module detects the input current of the lighting device and the color temperature of the light emitted by the lighting device so as to generate a dimming function detecting result and a color temperature adjusting function detecting result. The above active detecting mechanism makes the control device be able to generate a function analysis result according to the dimming function detecting result and the color temperature adjusting function detecting result. Then, the control device can display the control page corresponding to the function analysis result according to the function analysis result. In this way, the control page provided by the control device can be completely corresponding to the function of the lighting device in order to effectively avoid that the user considers that the lighting device malfunctions or the dimming controller malfunctions by mistake, which can improve user experience and meet actual requirements.

Also, according to one embodiment of the present invention, the lighting device control system includes the active function detecting device and the control device. The active function detecting device includes the active detecting signal generating module and the function detecting module, which can provide the active detecting function. Therefore, the control function of the control page provided by the control device can be completely corresponding to the function of the lighting device. As a result, the lighting device control system can be applied to different lighting devices, which is more comprehensive in use.

In addition, according to one embodiment of the present invention, the active function detecting device of the lighting device control system has a function detecting gear, a first gear corresponding to a first control interface, a second gear corresponding to a second control interface, a third gear corresponding to a third control interface and a fourth gear corresponding to a fourth control interface. Accordingly, the user can operate the above gears in order to actively active the aforementioned active detecting mechanism or directly designate the control interfaces which the control page of the control device needs to provide. Therefore, the lighting device control system can be more flexible in use and can conform to actual requirements.

Further, according to one embodiment of the present invention, the control device of the lighting device control system may be a smart phone, a smart watch, a tablet computer, a laptop computer, a personal computer or other similar devices. The control device can execute an application to generate the function analysis result according to the dimming function detecting result and the color temperature adjusting result so as to display the control page corresponding to the function analysis result. Thus, the user can execute the above function via any one of the mobile devices, which is more convenient in use. In this way, the popularity of the lighting device control system can be further increased.

Moreover, according to one embodiment of the present invention, the control device of the lighting device control system can perform the application to execute more functions. Thus, the control device can execute various intelligent operations so as to increase the functionality of the lighting device. Accordingly, the lighting device control system can conform to the future development trend.

Furthermore, according to one embodiment of the present invention, the design of the lighting device control system is simple, so the lighting device control system can achieve the desired technical effects without significantly increasing the cost thereof. Therefore, the lighting device control system can have high commercial value. As describe above, the lighting device control system according to the embodiments of the present invention can definitely achieve great technical effects.

Figure 7:
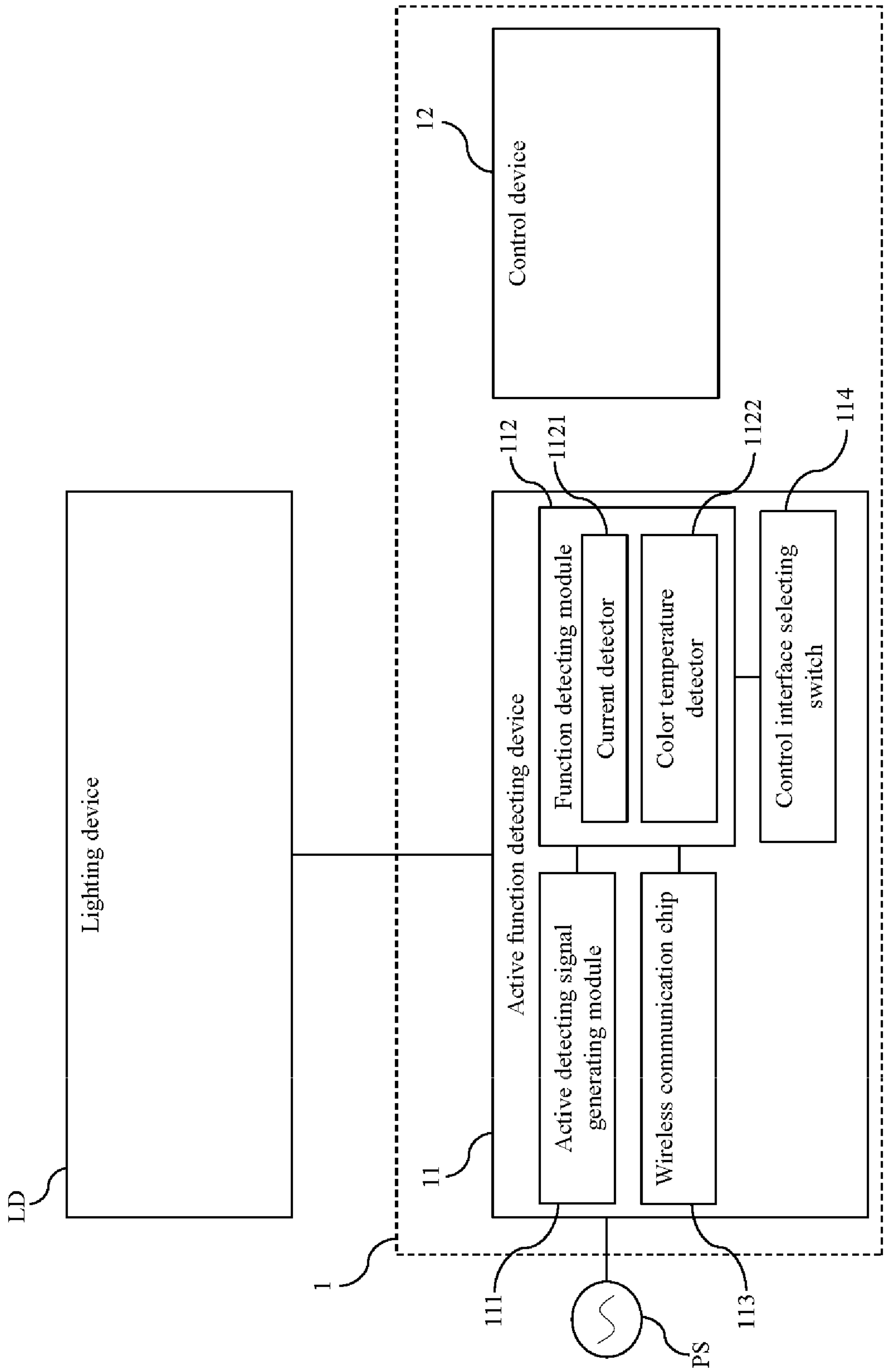
FIG. 7 is a block diagram of a lighting device control system having function detecting mechanism in accordance with another embodiment of the present invention.

Please refer to FIG. 7, which is a block diagram of a lighting device control system having function detecting mechanism in accordance with another embodiment of the present invention. As shown in FIG. 7, the lighting device control system 1 includes an active function detecting device 11 and a control device 12. The active function detecting device 11 can communicate with the control device 12. The active function detecting device 11 is connected to an external power source PS and a lighting device LD, such that the external power source PS is connected to the lighting device LD via the active function detecting device 11. The active function detecting device 11 includes an active detecting signal generating module 111, a function detecting module 112 and a wireless communication chip 113.

The above elements are similar to those of the previous embodiment, so will not be described herein again. The difference between this embodiment and the previous embodiment is that the lighting device control system 1 of this embodiment further includes a control interface selecting switch 114. The control interface selecting switch 114 has a function detecting gear, a first gear, a second gear, a fourth gear and a fourth gear. The first gear is corresponding to the first control interface UF1. The second gear is corresponding to the second control interface UF2. The third gear is corresponding to the third control interface UF3. The fourth gear is corresponding to the fourth control interface UF4.

The user can select one of the function detecting gear, the first gear, the second gear, the third gear and the fourth gear so as to perform the corresponding function.

If the user knows that the lighting device LD has no the dimming function and the color temperature adjusting function, the user can operate the control interface selecting switch 114 to select the first gear. In this way, thee dimming function detecting result Rs1 and the color temperature adjusting function detecting result Rs2 received by the control device 12 are the failed dimming function detecting signal and the color temperature adjusting function detecting failure signal respectively. Thus, the control page displayed by the control device 12 is the first control interface UF1.

Similarly, the user can operate the control interface selecting switch 114 to select the second gear, the third gear or the fourth gear, such that the control device 12 can display the second control interface UF2, the third control interface UF3 or the fourth control interface UF4.

If the user cannot make sure that the lighting device LD has the dimming function and the color temperature adjusting function, the user can operate the control interface selecting switch 114 to select the function detecting gear in order to actively activate the aforementioned active detecting mechanism.

Moreover, the control device 12 of the lighting device control system 1 can execute the application to perform more functions. Thus, the control device 12 can execute various intelligent operations so as to increase the functionality of the lighting device LD. Accordingly, the lighting device control system 1 can conform to the future development trend.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

To sum up, according to one embodiment of the present invention, the lighting device control system includes an active function detecting device and a control device. The active function detecting device includes an active detecting signal generating module and a function detecting module. The active detecting signal generating module transmits a dimming signal and a color temperature adjusting signal to a lighting device. The function detecting module detects the input current of the lighting device and the color temperature of the light emitted by the lighting device so as to generate a dimming function detecting result and a color temperature adjusting function detecting result. The above active detecting mechanism makes the control device be able to generate a function analysis result according to the dimming function detecting result and the color temperature adjusting function detecting result. Then, the control device can display the control page corresponding to the function analysis result according to the function analysis result. In this way, the control page provided by the control device can be completely corresponding to the function of the lighting device in order to effectively avoid that the user considers that the lighting device malfunctions or the dimming controller malfunctions by mistake, which can improve user experience and meet actual requirements.

Also, according to one embodiment of the present invention, the lighting device control system includes the active function detecting device and the control device. The active function detecting device includes the active detecting signal generating module and the function detecting module, which can provide the active detecting function. Therefore, the control function of the control page provided by the control device can be completely corresponding to the function of the lighting device. As a result, the lighting device control system can be applied to different lighting devices, which is more comprehensive in use.

In addition, according to one embodiment of the present invention, the active function detecting device of the lighting device control system has a function detecting gear, a first gear corresponding to a first control interface, a second gear corresponding to a second control interface, a third gear corresponding to a third control interface and a fourth gear corresponding to a fourth control interface. Accordingly, the user can operate the above gears in order to actively active the aforementioned active detecting mechanism or directly designate the control interfaces which the control page of the control device needs to provide. Therefore, the lighting device control system can be more flexible in use and can conform to actual requirements.

Further, according to one embodiment of the present invention, the control device of the lighting device control system may be a smart phone, a smart watch, a tablet computer, a laptop computer, a personal computer or other similar devices. The control device can execute an application to generate the function analysis result according to the dimming function detecting result and the color temperature adjusting result so as to display the control page corresponding to the function analysis result. Thus, the user can execute the above function via any one of the mobile devices, which is more convenient in use. In this way, the popularity of the lighting device control system can be further increased.

Moreover, according to one embodiment of the present invention, the control device of the lighting device control system can perform the application to execute more functions. Thus, the control device can execute various intelligent operations so as to increase the functionality of the lighting device. Accordingly, the lighting device control system can conform to the future development trend.

Furthermore, according to one embodiment of the present invention, the design of the lighting device control system is simple, so the lighting device control system can achieve the desired technical effects without significantly increasing the cost thereof. Therefore, the lighting device control system can have high commercial value.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device control system having function detecting mechanism, comprising:

an active function detecting device connected to an external power source and a lighting device, and comprising an active detecting signal generating module and a function detecting module, wherein the active detecting signal generating module is configured to transmit a dimming signal and a color temperature signal to the lighting device and the active detecting module is configured to detect an input current of the lighting device and a color temperature of a light emitted by the lighting device so as to generate a dimming function detecting result and a color temperature adjusting function detecting result; and a control device configured to generate a function analysis result according to the dimming function detecting result and the color temperature adjusting function detecting result, and display a control page corresponding to the function analysis result according to the function analysis result;

wherein the function detecting module comprises a current detector, wherein the current detector is configured to generate a successful dimming function detecting signal when the current detector detects that the input current of the lighting device changes, wherein the current detector is configured to generate a failed dimming function detecting signal when the current detector detects that the input current of the lighting device does not change.

2. The lighting device control system having function detecting mechanism as claimed in claim 1, wherein the control device transmits a detecting instruction to the active detecting signal generating module to control the active detecting signal generating module to transmit the dimming signal and the color temperature adjusting signal to the lighting device.

3. The lighting device control system having function detecting mechanism as claimed in claim 1, wherein the function detecting module comprises a color temperature detector, wherein the color temperature detector is configured to generate a color temperature adjusting function detecting successful signal when the color temperature detector detects that the color temperature of the light emitted by the lighting device changes, wherein the color temperature detector is configured to generate a color temperature adjusting function detecting failure signal when the color temperature detector detects that the color temperature of the light emitted by the lighting device does not change.

4. The lighting device control system having function detecting mechanism as claimed in claim 3, wherein the color temperature detector is a photoresistor sensor.

5. The lighting device control system having function detecting mechanism as claimed in claim 1, wherein the control page is a first control interface having a switch interface, a second control interface having the switch interface and a color temperature interface, a third control interface having the switch interface and a dimming interface or a fourth control interface having the switch interface, the color temperature interface and the dimming interface.

6. The lighting device control system having function detecting mechanism as claimed in claim 1, wherein the active function detecting device further comprises a wireless communication chip configured to receive the dimming function detecting result and the color temperature adjusting function detecting result in order to transmit the dimming function detecting result and the color temperature function adjusting detecting result to the control device.

* * * * *